United States Patent
Yu et al.

(10) Patent No.: US 10,122,466 B2
(45) Date of Patent: Nov. 6, 2018

(54) PHOTONIC VECTOR SIGNAL GENERATION USING HETERODYNE BEATING

(71) Applicant: ZTE Corporation, Shenzhen (CN)

(72) Inventors: Jianjun Yu, Basking Ridge, NJ (US); Xinying Li, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/338,224

(22) Filed: Oct. 28, 2016

(65) Prior Publication Data

US 2017/0126324 A1    May 4, 2017

Related U.S. Application Data

(60) Provisional application No. 62/248,088, filed on Oct. 29, 2015.

(51) Int. Cl.
| | | |
|---|---|---|
| H04B 10/516 | (2013.01) | |
| H04B 10/70 | (2013.01) | |
| H04B 10/50 | (2013.01) | |
| G02F 1/225 | (2006.01) | |
| G02F 1/21 | (2006.01) | |

(52) U.S. Cl.
CPC ....... *H04B 10/5161* (2013.01); *G02F 1/2255* (2013.01); *H04B 10/70* (2013.01); *G02F 2001/212* (2013.01)

(58) Field of Classification Search
None
See application file for complete search history.

(56) References Cited

U.S. PATENT DOCUMENTS

| | | | | |
|---|---|---|---|---|
| 4,932,775 A | * | 6/1990 | Wissman | G01S 17/32 356/28.5 |
| 2015/0086215 A1 | * | 3/2015 | Chen | H04B 10/2507 398/136 |
| 2016/0282699 A1 | * | 9/2016 | Gottwald | H04B 10/50577 |
| 2017/0033872 A1 | | 2/2017 | Yu et al. | |

OTHER PUBLICATIONS

Chen, L., et al., "A Novel Radio-Over-Fiber System With Wavelength Reuse for Upstream Data Connection," IEEE Photonics Technology Letters, 19(6):387-389, Mar. 2007.
Chen, Y., et al., "Microwave vector signal transmission over an optical fiber based on IQ modulation and coherent detection," Optics Letters, 39(6):1509-1512, Mar. 2014.
(Continued)

*Primary Examiner* — Darren E Wolf
(74) *Attorney, Agent, or Firm* — Perkins Coie LLP

(57) ABSTRACT

An exemplary technique of optical signal transmission in which modulated optical signals are generated using photonic heterodyne beating and operating a digital to analog converter at baseband includes receiving information bits, modulating the information bits to generate a precoded vector signal at baseband, generating, using photonic heterodyne beating, from the precoded vector signal at baseband, a precoded vector signal at an upconverted frequency, and transmitting the precoded vector signal at the upconverted frequency on the optical communication network.

28 Claims, 8 Drawing Sheets

(56) References Cited

OTHER PUBLICATIONS

Jiang, W.-J., et al., "Photonic vector signal generation employing a novel optical direct-detection in-phase/quadrature-phase upconversion," Optics Letters, 35(23):4069-4071, Dec. 2010.

Li, R., et al., "Millimeter-Wave Vector Signal Generation Based on a Bi-Directional Use of a Polarization Modulator in a Sagnac Loop," Journal of Lightwave Technology, 33(1):251-257, Jan. 2015.

Li, W., et al., "Microwave Generation Based on Optical Domain Microwave Frequency Octupling," IEEE Photonics Technology Letters, 22(1):24-26, Jan. 2010.

Li, X., et al., "Fiber-wireless transmission system of 108 Gb/s data over 80 km fiber and 2×2 multiple-input multiple-output wireless links at 100GHz W-band frequency," Optics Letters, 37(24):5106-5108, Dec. 2012.

Li, X., et al., "Fiber-Wireless—Fiber Link for 100-Gb/s PDM-QPSK Signal Transmission at W-Band," IEEE Photonics Technology Letters, 26(18):1825-1828, Sep. 2014.

Li, X., et al., "Photonic vector signal generation at W-band employing an optical frequency octupling scheme enabled by a single MZM," Optics Communications, 349:6-10, Aug. 2015.

Li, X., et al., "QAM Vector Signal Generation by Optical Carrier Suppression and Precoding Techniques," IEEE Photonics Technology Letters, 27(18):1977-1980, Sep. 2015.

Li, X., et al., "W-Band 8QAM Vector Signal Generation by MZM-Based Photonic Frequency Octupling," IEEE Photonics Technology Letters, 27(12):1257-1260, Jun. 2015.

Lin, C.-T., et al., "Photonic vector signal generation at microwave/millimeter-wave bands employing an optical frequency quadrupling scheme," Optics Letters, 34(14):2171-2173, Jul. 2009.

Wang, K., et al., "A Radio-Over-Fiber Downstream Link Employing Carrier-Suppressed Modulation Scheme to Regenerate and Transmit Vector Signals," IEEE Photonics Technology Letters, 19(18):1365-1367, Sep. 2007.

Wang, Y., et al., "Balanced Precoding Technique for Vector Signal Generation Based on OCS," IEEE Photonics Technology Letters, 27(23):2469-2472, Dec. 2015.

Xiao, J., et al., "OFDM Vector Signal Generation Based on Optical Carrier Suppression," IEEE Photonics Technology Letters, 27(23):2449-2452, Dec. 2015.

Yu, J., et al., "432-Gb/s PDM-16QAM Signal Wireless Delivery at W-band Using Optical and Antenna Polarization Multiplexing," European Conference on Optical Communication (ECOC), Cannes, France, Paper We.3.6.6, 3 pages, Sep. 2014.

Yu, J., et al., "Centralized Lightwave Radio-Over-Fiber System With Photonic Frequency Quadrupling for High-Frequency Millimeter-Wave Generation," IEEE Photonics Technology Letters, 19(19):1499-1501, Oct. 2007.

Yu, J., et al., "Optical Millimeter-Wave Generation or Up-Conversion Using External Modulators," IEEE Photonics Technology Letters, 18(1):265-267, Jan. 2006.

Yu, J., et al., "Ultra-High-Capacity DWDM Transmission System for 100G and Beyond," IEEE Communications Magazine, S56-S64, Mar. 2010.

Zhang, J., et al., "A Photonic Microwave Frequency Quadrupler Using Two Cascaded Intensity Modulators With Repetitious Optical Carrier Suppression," IEEE Photonics Technology Letters, 19(14)1057-1059, Jul. 2007.

Zhang, R., "Precoding Research on Vector Signal 16QAM Applied in the Frequency Doubling Scheme of ROF Link," Asia Communications and Photonics Conference 2013, OSA Technical Digest (online) (Optical Society of America, 2013), Beijing, China, Paper AF2F.2, 3 pages, Nov. 2013.

\* cited by examiner

PHOTONIC VECTOR SIGNAL GENERATION USING HETERODYNE BEATING

CROSS REFERENCE TO RELATED APPLICATIONS

This patent document claims the benefit of priority of U.S. Provisional Patent Application No. 62/248,088, filed on Oct. 29, 2015. The entire content of the before-mentioned patent application is incorporated by reference as part of the disclosure of this document.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

The present document discloses, inter alia, techniques for generation of modulated vector signals using heterodyne beating in which a digital to analog convertor (DAC) that is operating at the baseband frequency.

In one example aspect, a method of optical communication is disclosed. The method includes receiving information bits, modulating the information bits to generate a precoded vector signal at baseband, generating, using photonic heterodyne beating, from the precoded vector signal at baseband, a precoded vector signal at an upconverted frequency, and transmitting an optical transmission signal, generated from the precoded vector signal at the upconverted frequency, on the optical communication network.

In another example aspect, an optical transmitter apparatus includes a data interface that receives information bits, a baseband modulator that modulates the information bits to generate a precoded vector signal at baseband, a photonic heterodyne beating subsystem that generates, using photonic heterodyne beating, from the precoded vector signal at baseband, a precoded vector signal at an upconverted frequency, and an optical transmitter that transmits an optical signal generated from the precoded vector signal at the upconverted frequency on an optical transmission medium.

These and other aspects, and their implementations and variations are set forth in the drawings, the description and the claims.

DETAILED DESCRIPTION

Figure 1:
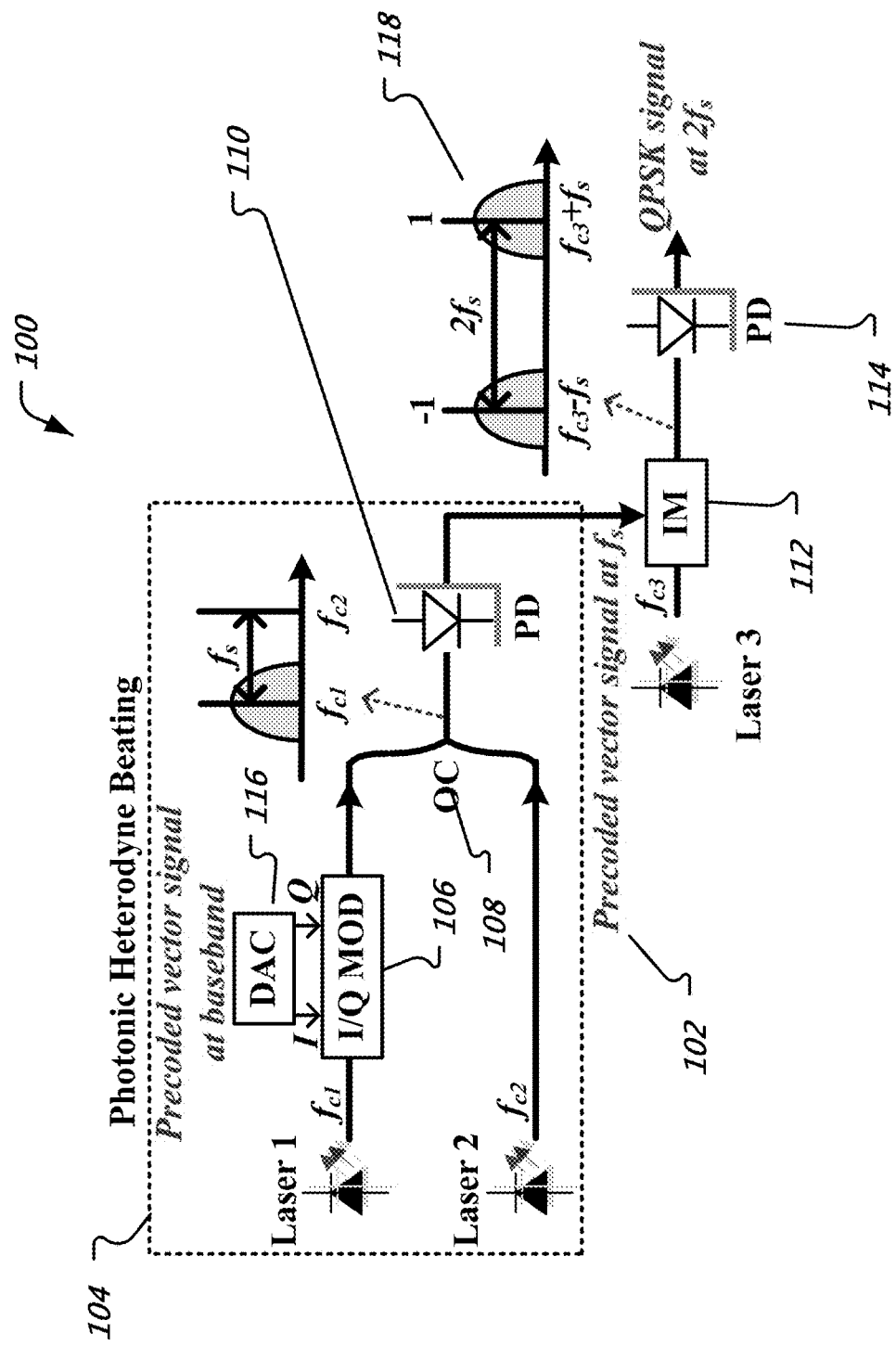
FIG. 1 shows an example block diagram for a system for quadrature phase shift keying (QPSK) modulated vector signal generation based on photonic heterodyne beating, phase precoding and OCS. The following abbreviations are used: DAC: digital-to-analog converter, I/Q MOD: I/Q modulator, OC: optical coupler, PD: photodetector, IM: intensity modulator.

Due to the wide spreading of multimedia services, broadband internet, and cloud services, demands on the capacity of access networks are growing continuously. Numerous access techniques, such as passive optical network (PON), 802.11 Wi-Fi, visible light communication (VLC), radio-over-fiber (RoF) technology have attracted increasing interest for their potential use in future broadband wireless communications and future network services like 5G due to the advantages of inherent wide bandwidth, wide coverage, high mobility and low propagation loss of optical fiber transmission. Additionally, in order to achieve high spectral efficiency (SE) in terms of number of bits transmitted per Hertz per second, and maximum transmission capacity, techniques such as vector quadrature-amplitude-modulation (QAM) signal modulation formats are desirable.

The combination of vector signal modulation and radio on fiber (RoF) technology shows promise to efficiently overcome the limitation of scarce spectrum resources and provide higher data rate transmission. However, how to practically generate vector signals at a high-frequency band based on the bandwidth-limited electrical devices still remains unsolved.

Recently, several RoF systems by photonics techniques have been proposed and experimentally investigated. Remote heterodyning has been considered as a promising candidate due to the ease of implementation. But, in such implementations, either a narrow-linewidth laser is required or the generated RF signal is not stable due to unlocked frequency of free-running lightwaves. External intensity modulation incorporating photonic frequency multiplication, such as frequency doubling and tripling, is a more attractive and cost-effective solution to generate stable and high-frequency RF vector signals, which can also greatly reduce the bandwidth requirement for electrical devices at transmitter end. However, in such systems, precoding is needed to address the phase multiplication induced by the frequency multiplication, which causes an undesirable increase in the complexity of transmitter digital signal processing (DSP). The techniques disclosed in the present document solve the above discussed shortcoming in the prior art, and more.

Briefly and in general terms, in one aspect, a scheme for QPSK-modulated vector signal generation based on photonic heterodyne beating, phase precoding and optical carrier suppression (OCS) is disclosed. In U.S. Provisional Patent Application Ser. No. 62/199,996, filed on Aug. 1, 2015, incorporated herein by reference in its entirety, the inventors have previously disclosed OCS-based vector signal generation scheme without precoding. Different from the embodiments described therein, as described in the present document, the precoded vector signal at a radio-frequency (RF) band, used to drive the intensity modulator operating at its OCS point, is generated by photonic heterodyning beating rather than a single digital-to-analog converter (DAC). The photonic heterodyne beating accomplishes the upconversion of the precoded vector signal from baseband to RF band, and thus the DAC in the disclosed scheme is used to generate precoded vector signal at baseband rather than that at RF band, which significantly reduces the DAC bandwidth requirement. As a proof of concept of the disclosed technique, a 17.6-GHz QPSK modulated vector signal generation was experimentally demonstrated based on an embodiment of the technique described herein. The generated 17.6-GHz vector signal can carry up to 3-Gbaud QPSK data with a bit-error ratio (BER) less than the hard-decision forward-error-correction (HD-FEC) threshold of $3.8 \times 10^{-3}$.

Figure 6:
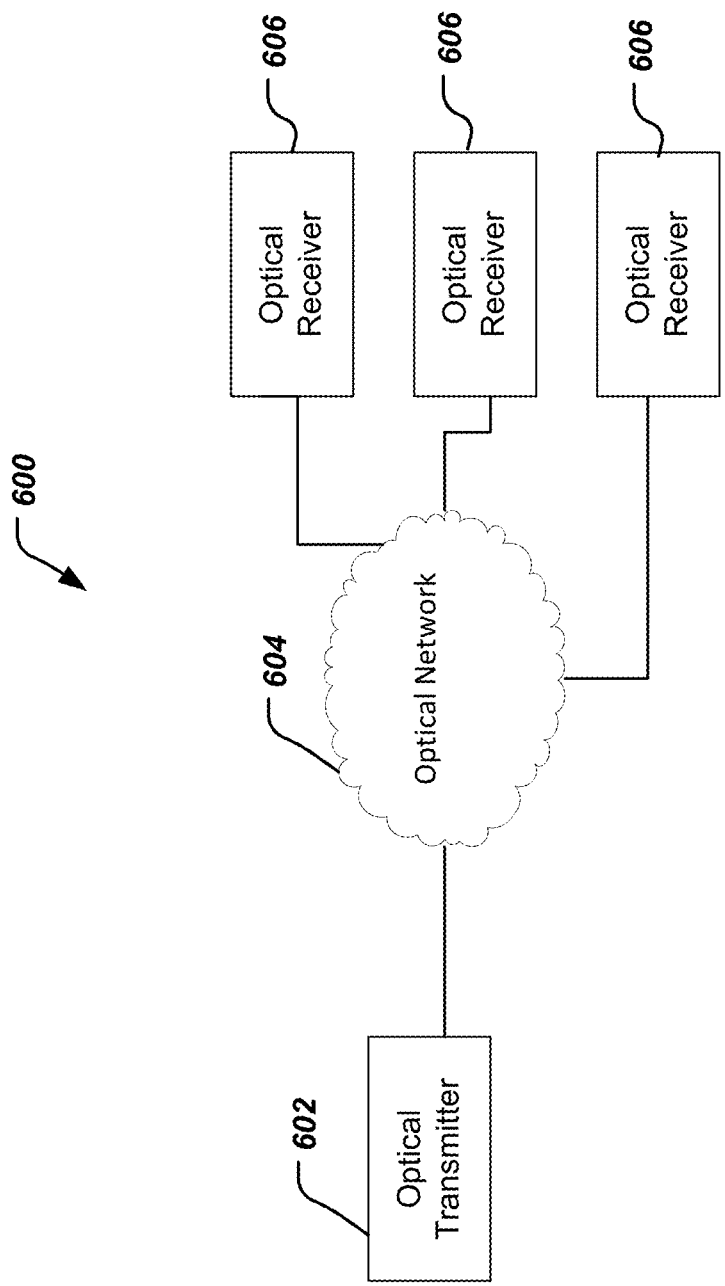
FIG. 6 is a block diagram that shows an example of an optical communication system.

FIG. 6 depicts an optical communication system 600 in which the presently disclosed technology can be embodied. One or more optical transmitters 602 are communicatively coupled via an optical network 604 with one or more optical receivers 606. The optical network 604 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 6 for clarity. The modulation schemes described in the present document can be implemented in the transmission circuitry of the optical transmitter 602 or the optical receiver 606.

Brief Overview

Advanced vector signal modulation encodes the data information onto both in-phase (I) and quadrature (Q) components of a carrier, and when combined with advanced digital signal processing (DSP), can effectively improve device's bandwidth efficiency and system's spectral efficiency. The introduction of advanced vector signal modulation into the radio-over-fiber (RoF) system, which has become a promising candidate in future broadband wireless communications due to its advantages of large bandwidth, high mobility and low propagation loss, can effectively solve the urgent problem of spectrum resource insufficiency and significantly increases transmission rates (whether wired rates over optical fibers or wireless rates when used in wireless transmissions). Thus, the RoF system, which can generate and transmit radio-frequency (RF) carrier employing advanced vector signal modulation, has gained increasing interest from the research community, and various kinds of advanced techniques have been proposed to realize this kind of RoF system. The technique of external intensity modulation makes use of the heterodyne beating of the sidebands generated by external intensity modulator driven by a RF signal, and can provide the RoF system with very stable RF carrier, the frequency of which only depends on the driving RF signal. Moreover, external intensity modulation, when further combined with optical carrier suppression (OCS) technique, can double the RF carrier frequency with the reduced bandwidth requirement for both optical and electrical components at the transmitter end.

Recently, the inventors have disclosed and experimentally demonstrated vector RF signal generation enabled by a single intensity modulator operating at its OCS point as well as precoding technique (U.S. Provisional Patent Application Ser. No. 62/199,996). OCS-based vector signal generation schemes can be implemented relatively easily, but the insufficient bandwidth (typically less than 20 GHz) of the current commercially available digital-to-analog converters (DACs) greatly restricts the RF carrier frequency of the generated vector signal, since the precoded vector RF signal used for the drive of the intensity modulator is directly generated by a single DAC. Thus, it is beneficial to investigate how to overcome the DAC bandwidth limitation and thus to realize high-frequency vector RF signal generation based on OCS-based vector signal generation schemes.

In an exemplary aspect, a scheme for quadrature-phase-shift-keying (QPSK) modulated vector signal generation based on photonic heterodyne beating, phase precoding and OCS is disclosed. Different from the previously disclosed OCS-based vector signal generation schemes, in the presently disclosed technique, the precoded vector signal at RF band, used for the drive of the intensity modulator operating at its OCS point, is generated by photonic heterodyne beating rather than a single DAC. Photonic heterodyne beating accomplishes the upconversion of the precoded vector signal from baseband to RF band, and thus significantly reduces the DAC bandwidth requirement. A 17.6-GHz QPSK modulated vector signal generation is experimentally demonstrated based on the proposed exemplary scheme. The generated 17.6-GHz vector signal can carry up to 3-Gbaud QPSK data with a bit-error ratio (BER) less than the hard-decision forward-error-correction (HD-FEC) threshold of $3.8 \times 10^{-3}$.

Overview

FIG. 1 shows a system configuration 100 of QPSK modulated vector signal generation based on photonic heterodyne beating, phase precoding and OCS. The precoded vector signal 102, is centered at frequency $f_s$, and is used for the drive of an intensity modulator. The signal is generated by photonic heterodyning beating 104 rather than a single DAC.

For photonic heterodyne beating 104, two free-running lasers (Laser 1 and Laser 2) operating at different frequencies $f_{c1}$ and $f_{c2}$, respectively, are used. The frequency spacing $f_s$ ($f_s = f_{c2} - f_{c1}$) of the two lasers is tunable. The continuous-wave (CW) lightwave from Laser 1 is modulated by a precoded vector signal at baseband with the aid of an in-phase/quadrature (I/Q) modulator 106. For data transmission, the precoded vector signal at baseband may be generated by modulating user data and/or other data. For a proof-of-concept experiment, the precoded vector signal at baseband is first generated by MATLAB programming, and then uploaded into a DAC before it is used to drive the I/Q modulator 106. The MATLAB programming accomplishes the QPSK mapping and phase precoding of a pseudo random binary sequence (PRBS). Either unbalanced or balanced phase precoding could be used with the technique disclosed herein.

In some embodiments, the I/Q modulator could include two parallel Mach-Zehnder modulators (MZMs), both preferably biased at the null point, and driven at the full swing. The upper and lower branches of the I/Q modulator (the in-phase and the quadrature branch) have a fixed phase difference of π/2. Next, the modulated CW lightwave is combined with the unmodulated one from Laser 2 by an optical coupler (OC) 108, and then heterodyne beat in a single-ended photodetector (PD) 110, to upconvert the precoded vector signal from baseband to frequency $f_s$.

The upconverted precoded vector signal at frequency $f_s$ modulates the CW lightwave from Laser 3 with the aid of an intensity modulator IM 112. Laser 3 is also free-running and operates at frequency $f_{c3}$. The intensity modulator 112 operates at its minimum transmission point to implement OCS modulation. Thus, two first-order optical subcarriers are generated by the intensity modulator 112, with a frequency spacing of $2f_s$ (shown in the spectrum graph 118). The two first-order optical subcarriers are heterodyne beat, preferably in a single-ended configuration of PD 114, and QPSK modulated vector signal at frequency $2f_s$ can be obtained, since phase precoding at the transmitter end can effectively offset the phased doubling induced by frequency doubling during the square-law PD detection.

Compared to the previously disclosed OCS-based vector signal generation schemes, although the introduction of photonic heterodyne beating changes the architecture of configuration 100, and, in one advantageous aspect, significantly reduces the DAC bandwidth requirement. In another advantageous aspect, the DAC 116 used in configuration 100 is used to generate precoded vector signal at baseband rather than that at RF band. Thus, the technique depicted in the configuration 100 can effectively overcome the bandwidth limitation of the current commercially available DACs and can realize vector signal generation with a higher RF carrier frequency.

Example Setups

Figure 2:
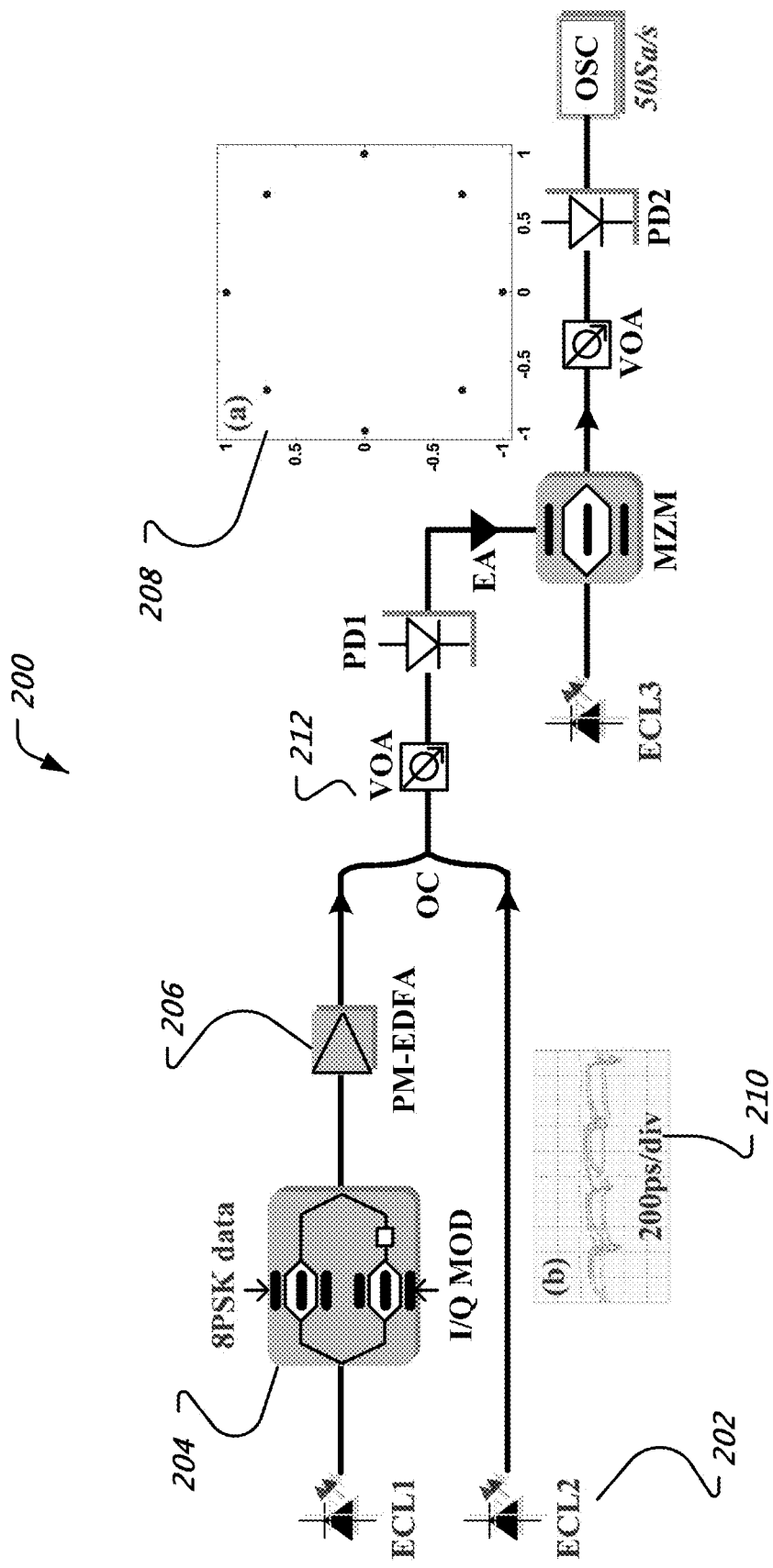
FIG. 2 show an example setup for 17.6-GHz QPSK modulated vector signal generation, showing inset (a) Calculated 8PSK constellation after balanced phase precoding; and inset (b) Output eye diagram (200 ps/div) of the I/Q modulator. The abbreviations include: ECL: external cavity laser, I/Q MOD: I/Q modulator, PM-EDFA: polarization-maintaining erbium-doped fiber amplifier, OC: optical coupler, VOA: variable optical attenuator, PD: photodetector, EA: electrical amplifier, MZM: Mach-Zehnder modulator, OSC: oscilloscope.

FIG. 2 shows an example setup 200 for 17.6-GHz QPSK modulated vector signal generation according to some embodiments. The 8.8-GHz precoded vector signal, used for the drive of the MZM, is generated by photonic heterodyne beating of two CW lightwaves spaced by 8.8 GHz. The two CW lightwaves are generated from two free-running external cavity lasers (ECLs) 202, while ECL1 operates at 1564.582 nm and ECL2 at 1564.514 nm. The CW lightwave from ECL1 is modulated by a 1~3-Gbaud precoded vector signal at baseband via an I/Q modulator 204, and then boosted by an optional polarization-maintaining erbium-doped fiber amplifier (PM-EDFA). For proof-of-concept experimentation, the PRBS (pseudo random binary sequence) length is $2^{10}$. Balanced phase precoding was used during proof-of-concept experimentation, since it can make the constellation of the generated QPSK vector signal more symmetrical and thus improve the receiver sensitivity compared to unbalanced phase precoding. Therefore, in our experiment, the precoded vector signal at baseband actually carries a 1~3-Gbaud 8PSK data.

Inset (a) in FIG. 2 (208) gives the calculated 8PSK constellation after balanced phase precoding. An arbitrary waveform generator (AWG), with 8-bit resolution, 80-GSa/s sampling rate and 16-GHz electrical bandwidth, is used to implement digital-to-analog conversion of the precoded vector signal at baseband. The I/Q modulator has a 3-dB bandwidth of ~30 GHz, 2.3-V half-wave voltage ($V_\pi$) at 1 GHz and 5-dB insertion loss. Inset (b) in FIG. 2 (210) shows an example output eye diagram (200 ps/div) of the I/Q modulator. The modulated CW lightwave, combined with the unmodulated lightwave from ECL2 (using an optical combiner), first passes through a variable optical attenuator (VOA) 212 before it is heterodyne beat in a single-ended PD (denoted by PD1). A commercially available PD1, e.g., Agilent 11982A, which has 15-GHz optical bandwidth, can be used.

Then, after boosting by an electrical amplifier (EA) to ~6 $V_{pp}$ ($V_{pp}$ denotes the peak-to-peak voltage), the up-converted 8.8-GHz precoded vector signal is used to modulate the CW lightwave from ECL3 at 1551.102 nm, via a MZM biased at its OCS transmission point. All the three ECLs (ECL1-ECL3) in the setup 200 can have a linewidth less than 100 kHz and output power of 14.5 dBm. The EA has 5-dB noise figure, 14-GHz electrical bandwidth and 30-dBm saturation output power. The MZM has a 3-dB bandwidth of ~31 GHz, 2.7-V half-wave voltage ($V_\pi$) at 1 GHz and 5-dB insertion loss. In general, any commercially available EA and MZM with these performance numbers could be used.

Figure 3:
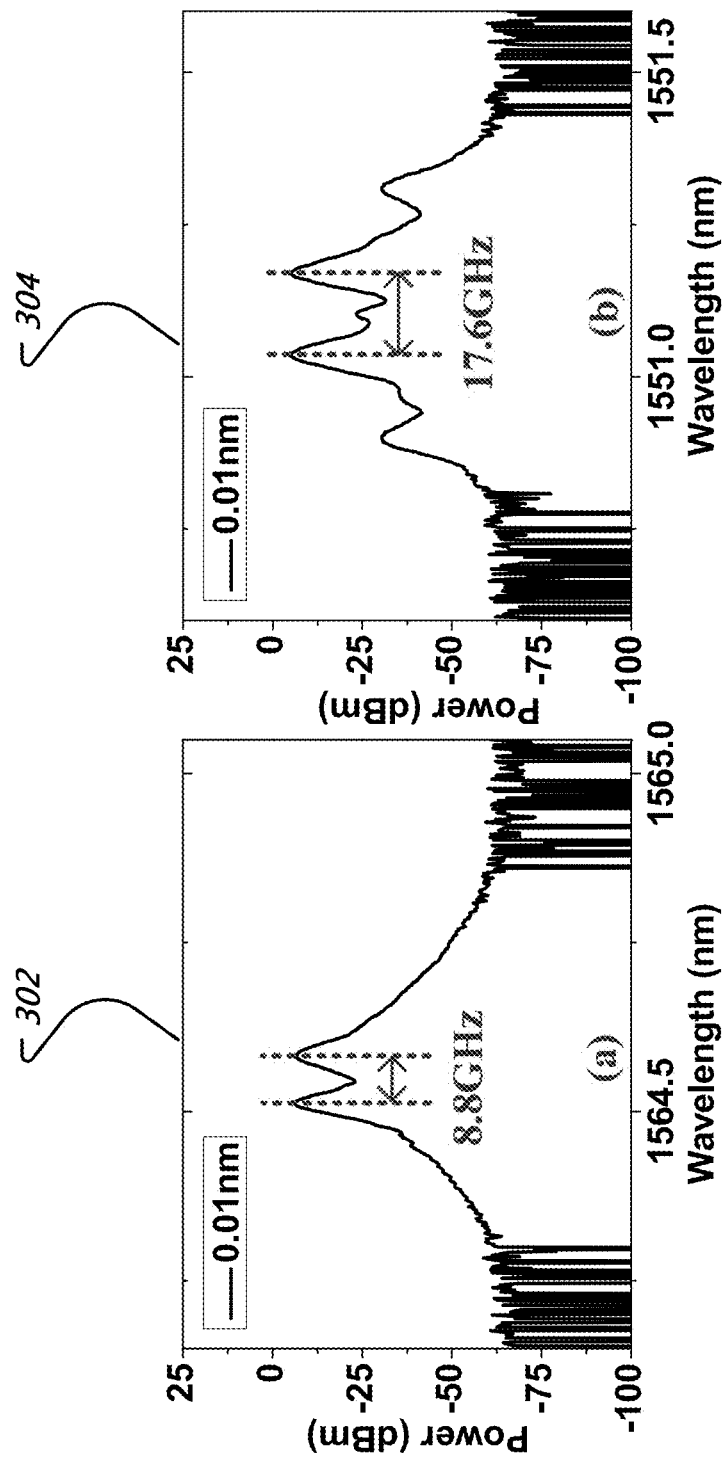
FIG. 3 shows an example of output optical spectra (0.01-nm resolution) of (a) the first VOA and (b) the MZM.

FIG. 3 shows various output spectra. Graph (a) 302 and (b) 304 respectively show the output optical spectra (0.01-nm resolution) of the first VOA and the MZM, respectively. The generated two first-order optical subcarriers by the MZM have 17.6-GHz frequency spacing. After passing through a VOA, the two first-order optical subcarriers are heterodyne beat in a single-ended PD (denoted by PD2 and identical to PD1), to generate QPSK modulated vector signal at 17.6 GHz. The generated 17.6-GHz QPSK modulated vector signal is captured by a digital storage oscilloscope (OSC) from Tektronix with 50-GSa/s sampling rate and 18-GHz electrical bandwidth. The transmitter QPSK data can be recovered from the captured 17.6-GHz QPSK modulated vector signal after offline DSP, which includes down conversion, constant modulus algorithm (CMA) equalization, frequency offset estimation, carrier phase estimation, differential decoding and BER calculation.

Experimental Results

Figure 4:
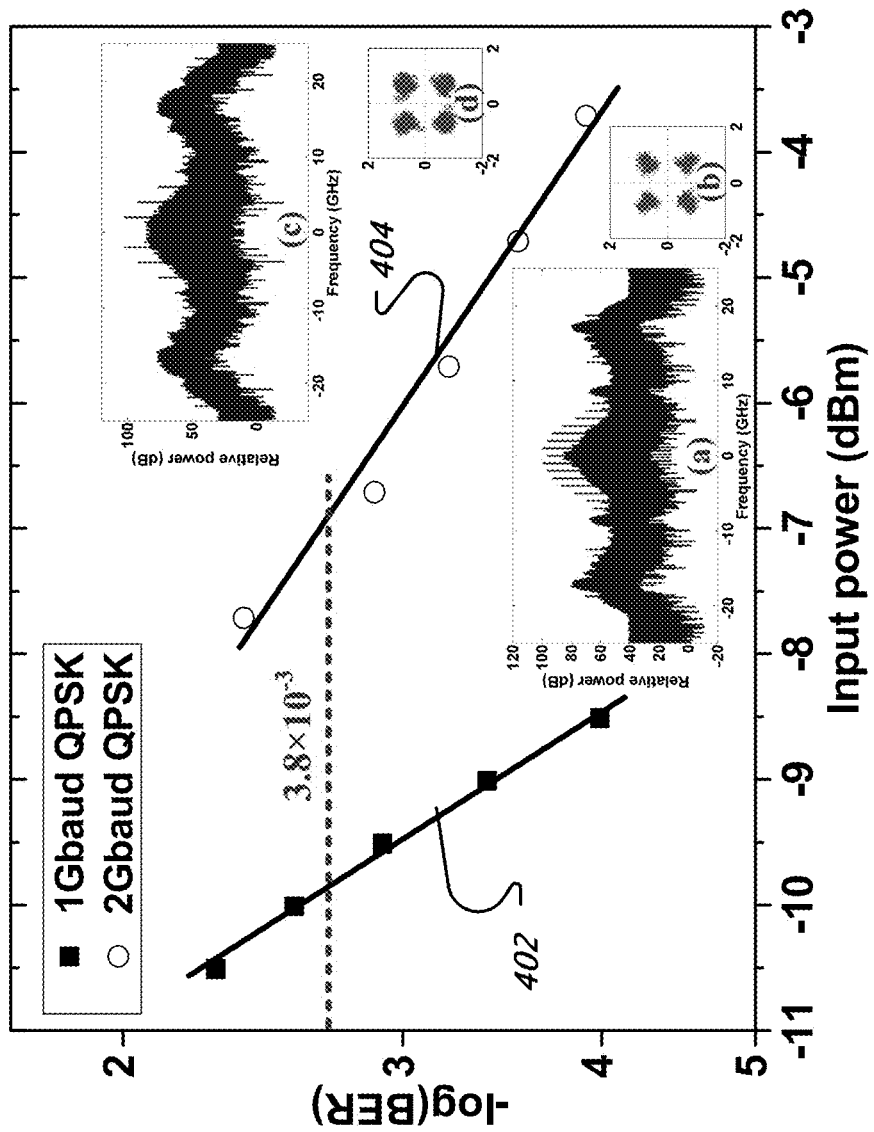
FIG. 4 depicts an example of a measured BER versus input power into PD2. Insets (a) and (b) show the captured 17.6-GHz vector signal spectrum and the recovered QPSK constellation for the 1-Gbaud vector signal, respectively. Insets (c) and (d) show the captured 17.6-GHz vector signal spectrum and the recovered QPSK constellation for the 2-Gbaud vector signal, respectively).

FIG. 4 shows the measured BER (vertical axis) versus the input power into PD2 (horizontal axis) for 1- and 2-Gbaud QPSK vector signals, in curves 402 and 404 respectively. The BER is counted over $10 \times 10^6$ bits (10 data sets, and each set contains $10^6$ bits). For both 1-and 2-Gbaud cases, the BER can be under the HD-FEC threshold of $3.8 \times 10^{-3}$. Moreover, compared to the 1-Gbaud case, the 2-Gbaud case has a 3-dB optical power penalty at the HD-FEC threshold of $3.8 \times 10^{-3}$, which is mainly due to the limited OSC bandwidth of 18 GHz. Insets (a) and (b) in FIG. 4 show the captured 17.6-GHz vector signal spectrum and the recovered QPSK constellation for the 1-Gbaud vector signal, respectively. The corresponding input power into PD2 is −5 dBm and the BER is 0. Insets (c) and (d) in FIG. 4 show the captured 17.6-GHz vector signal spectrum and the recovered QPSK constellation for the 2-Gbaud vector signal, respectively. The corresponding input power into PD2 is 2 dBm and the BER is also 0.

Figure 5:
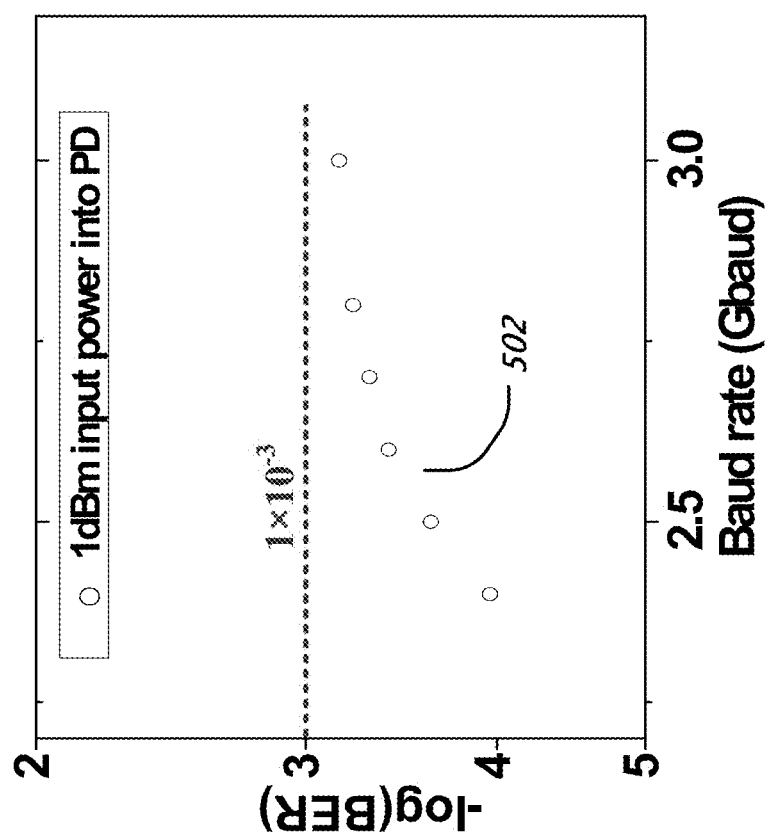
FIG. 5 shows an example of measured BER versus baud rate.

FIG. 5 shows the measured BER (vertical axis) versus the baud rate (horizontal axis) when the input power into PD2 is 1 dBm. As can be seen from curve 502, the BER gradually increases but is always under the BER of $1 \times 10^{-3}$ when the baud rate increases from 2.4 Gbaud to 3.0 Gbaud. An error floor appears near the BER of $1 \times 10^{-3}$ mainly because of the limited OSC bandwidth of 18 GHz. If the OSC bandwidth is sufficient, the theoretical highest baud rate our experimental demonstration can achieve is 50 Gbaud, which is mainly determined by the RF carrier frequency of the upconverted precoded vector signal.

Figure 7:
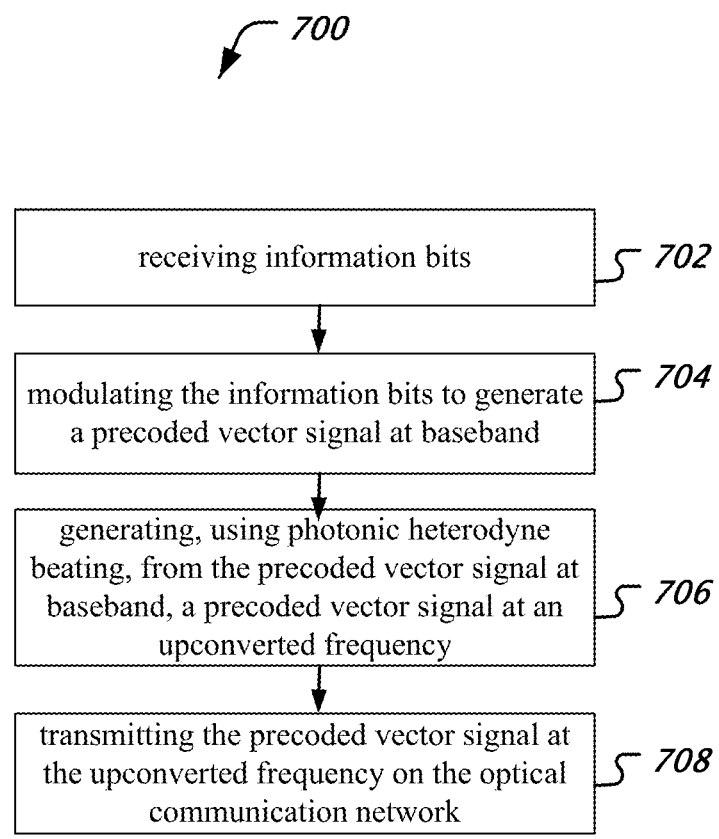
FIG. 7 shows an example flowchart of an optical signal transmission method.

FIG. 7 shows a flowchart for an example method 700 for optical transmission. The method 700 may be implemented by the transmission circuitry in the optical equipment 602, 606.

The method 700 includes, at 702, receiving information bits. In some embodiments, the received information bits may be received from an external network device, e.g., a network traffic aggregation point at which data from multiple users is multiplexed together for transmission over a network. In some embodiments, the information bits may be locally generated in the optical equipment itself, e.g., control and management data, and may be received from the application running on the optical equipment by the transmission section of the equipment, e.g., over a data bus.

The method 700 includes, at 704, modulating the information bits to generate a precoded vector signal at baseband. In some embodiments, the modulation may be performed by operating a first Mach-Zehnder modulator (MZM) to generate an in-phase modulation output from the precoded vector signal, and operating a second MZM to generate a quadrature modulation output from the precoded vector signal. In some embodiments, the first MZM and the second MZM are operated by biasing at their respective null points and driven at their respective full voltage swings. In various embodiments, QPSK modulation (e.g., 8 or 16 QPSK) or QAM modulation may be used. A balanced QPSK modulation may be used in some embodiments. Alternatively, unbalanced modulation may also be used. FIG. 1 and FIG. 2 and associated description provides some example embodiments of the modulation operation.

The method 700 includes, at 706, generating, using photonic heterodyne beating, from the precoded vector signal at baseband, a precoded vector signal at an upconverted frequency. The photonic heterodyne beating may be achieved by modulating a first optical carrier signal using the precoded vector signal at baseband to generate a carrier-modulated precoded vector signal, combining, in an optical domain, the carrier modulated precoded vector signal with a second optical carrier signal, passing a resulting signal of the combining through a photo-detector to generate the precoded vector signal at the upconverted frequency. The upconverted frequency is equal to a frequency difference between frequencies of the first optical carrier signal and the second optical carrier signal. Some example embodiments of the process are described with respect to FIG. 1 and FIG. 2.

The method 700 includes, at 708, transmitting an optical transmission signal, generated from the precoded vector signal at the upconverted frequency, on the optical communication network. The transmission operation may include performing intensity modulation of a third optical carrier signal to generate two first-order modulated optical subcarriers, and generating the optical transmission signal by heterodyne beating the two first-order modulated optical subcarriers through a photodetector. In some embodiments, the PD is operated in a single-ended configuration.

Figure 8:
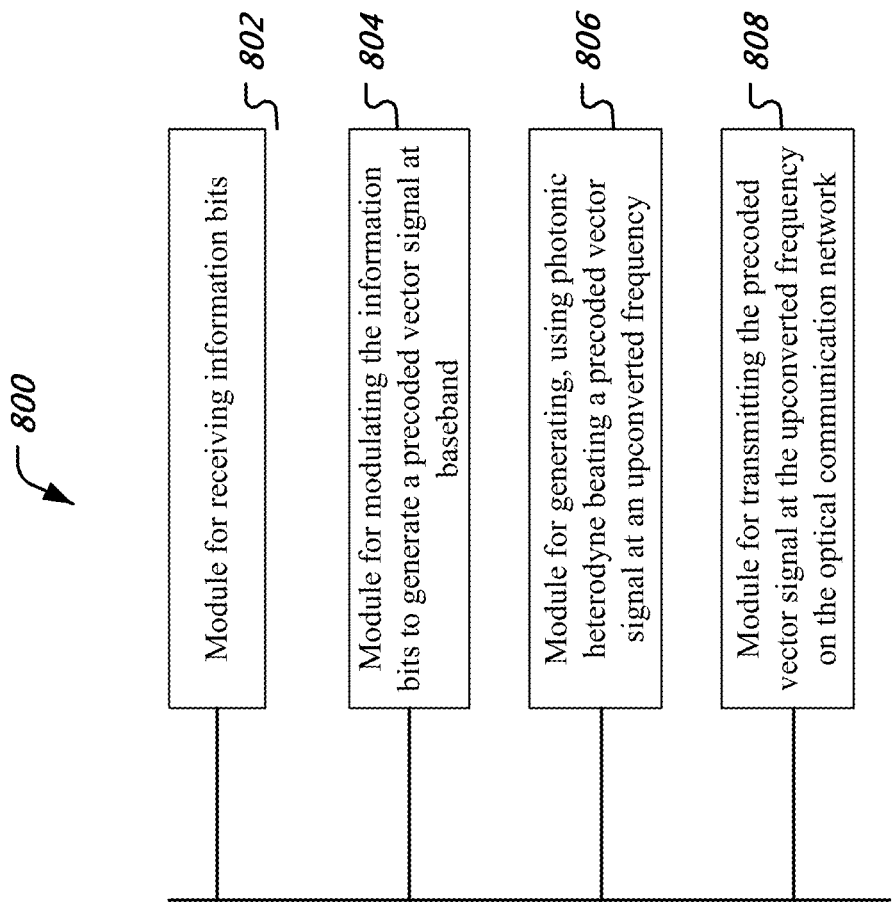
FIG. 8 shows an example of an optical signal transmission apparatus.

FIG. 8 shows a block diagram of an example transmission apparatus 800. The module 802 is for receiving information bits. The module 804 is for modulating the information bits to generate a precoded vector signal at baseband. The module 806 is for generating, using photonic heterodyne beating, from the precoded vector signal at baseband, a precoded vector signal at an upconverted frequency. The module 808 is for transmitting an optical transmission signal, generated from the precoded vector signal at the upconverted frequency, on the optical communication network. The apparatus 800 and modules 802, 804, 806 and 808 may perform further operations described with respect to the method 700.

In some embodiments, an optical transmission apparatus includes a data interface that receives information bits, a baseband modulator that modulates the information bits to generate a precoded vector signal at baseband, a photonic heterodyne beating subsystem that generates, using photonic heterodyne beating, from the precoded vector signal at baseband, a precoded vector signal at an upconverted frequency, and an optical transmitter that transmits an optical signal generated from the precoded vector signal at the upconverted frequency on an optical transmission medium.

In some embodiments, the baseband modulator includes a first Mach-Zehnder modulator (MZM) having a first input coupled to the data interface and a first output coupled to an adder, the first MZM generating an in-phase modulation output from the precoded vector signal, a second MZM having a second input coupled to the data interface and a second output coupled to the adder through a phase shifter, the second MZM generating a quadrature modulation output from the precoded vector signal, and the adder has an adder output for outputting the precoded vector signal at baseband. In some embodiments, the first MZM and the second MZM are operated by biasing at their respective null points and driven at their respective full voltage swings.

In some embodiments, the photonic heterodyne beating subsystem includes a first source of a first optical carrier signal that is coupled to the baseband modulator such that the baseband modulator modulates first optical carrier signal using the precoded vector signal at baseband to generate a carrier-modulated precoded vector signal, a second source of a second optical carrier signal coupled to an optical combiner, the optical combiner having two inputs of which a first input is coupled to an output of the baseband modulator and the second input is coupled to the second source of the second optical carrier signal, thereby combining, in an optical domain, the carrier modulated precoded vector signal with a second optical carrier signal, and a photo-detector coupled to an output of the optical combiner to generate the precoded vector signal at the upconverted frequency. The upconverted frequency is equal to a frequency difference between frequencies of the first optical carrier signal and the second optical carrier signal.

In some embodiments, the modulating the information bits includes modulating the information bits using a quadrature phase shift keying (QPSK) modulation scheme, e.g., using 8 or 16 QPSK modulation.

In some embodiments, the transmitter may include an intensity modulator (IM) having an IM input to receive the precoded vector signal at the upconverted frequency, a carrier input to receive an optical carrier signal and an IM output to output a signal that includes two first-order modulated optical subcarriers, and a photodetector (PD) that includes a PD input coupled to the IM output and a PD output to output the optical transmission signal by heterodyne beating the two first-order modulated optical subcarriers.

CONCLUSION

Various embodiments of a technique for QPSK or QAM modulated vector signal generation based on photonic heterodyne beating, phase precoding and OCS are described. The introduction of photonic heterodyne beating into our proposed scheme significantly reduces the DAC bandwidth requirement but at the cost of a more complex architecture. The inventors have experimentally demonstrated 17.6-GHz QPSK modulated vector signal generation based on embodiments of the technique disclosed herein. The generated 17.6-GHz vector signal can carry up to 3-Gbaud QPSK data with a BER less than the HD-FEC threshold of $3.8 \times 10^{-3}$. In some embodiments, vector mm-wave signal with a carrier frequency over 100 GHz can be generated using the disclosed technique based on OCS modulation in one intensity modulator.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a transmitter in an optical communication network, comprising:
   receiving information bits;
   modulating, using in-phase and quadrature modulation, the information bits to generate a precoded vector signal at baseband;
   generating, using photonic heterodyne beating, from the precoded vector signal at baseband, a precoded vector signal at an upconverted frequency, wherein the photonic heterodyne beating includes:
      modulating a first optical carrier signal using the precoded vector signal at baseband to generate a carrier-modulated precoded vector signal,
      combining, in an optical domain, the carrier modulated precoded vector signal with a second optical carrier signal, wherein the first optical carrier signal and the second optical carrier signal have different frequencies, and
      passing a resulting signal of the combining through a photo-detector to generate the precoded vector signal at the upconverted frequency; and
   transmitting an optical transmission signal, generated from the precoded vector signal at the upconverted frequency, on the optical communication network.

2. The method of claim 1, wherein the receiving includes:
   receiving information bits from an external network device, wherein the information bits includes data multiplexed together from multiple users.

3. The method of claim 1, wherein the receiving includes: receiving information bits locally generated in the transmitter.

4. The method of claim 1, wherein the modulating includes:
operating a first Mach-Zehnder modulator (MZM) to generate an in-phase modulation output from the precoded vector signal; and
operating a second MZM to generate a quadrature modulation output from the precoded vector signal.

5. The method of claim 4, wherein the first MZM and the second MZM are operated by biasing at their respective null points and driven at their respective full voltage swings.

6. The method of claim 1,
wherein the upconverted frequency is equal to a frequency difference between frequencies of the first optical carrier signal and the second optical carrier signal.

7. The method of claim 1, wherein the modulating the information bits includes using a quadrature phase shift keying (QPSK) modulation scheme.

8. The method of claim 7, wherein the QPSK modulation scheme is an 8-QPSK modulation scheme.

9. The method of claim 7, wherein the QPSK modulation scheme is a balanced QPSK modulation scheme.

10. The method of claim 1, wherein the modulating the information bits includes using an unbalanced modulation scheme.

11. The method of claim 1, wherein the combining, in the optical domain, the carrier modulated precoded vector signal with a second optical carrier signal, includes combining using an optical coupler.

12. The method of claim 1, wherein the transmitting is performed by:
performing intensity modulation of a third optical carrier signal to generate two first-order modulated optical subcarriers; and
generating the optical transmission signal by heterodyne beating the two first-order modulated optical subcarriers through a photodetector.

13. The method of claim 12, wherein the performing intensity modulation includes operating an intensity modulator at a minimum transmission point to implement optical carrier suppression modulation.

14. The method of claim 1, further including operating the photodetector in a single-ended configuration.

15. The method of claim 1, wherein the modulating the information bits includes modulating the information bits using a quadrature amplitude modulation (QAM) scheme.

16. An optical transmitter apparatus, comprising:
a data interface that receives information bits;
an I/Q modulator that modulates the information bits to generate a precoded vector signal at baseband;
a photonic heterodyne beating subsystem that generates, using photonic heterodyne beating, from the precoded vector signal at baseband, a precoded vector signal at an upconverted frequency, wherein the photonic heterodyne beating subsystem includes:
a first source of a first optical carrier signal is coupled to the I/Q modulator such that the I/Q modulator modulates first optical carrier signal using the precoded vector signal at baseband to generate a carrier-modulated precoded vector signal,
a second source of a second optical carrier signal is coupled to an optical combiner, wherein the first optical carrier signal and the second optical carrier signal have different frequencies,
the optical combiner having two inputs of which a first input is coupled to an output of the I/Q modulator and the second input is coupled to the second source of the second optical carrier signal, thereby combining, in an optical domain, the carrier modulated precoded vector signal with a second optical carrier signal,
a photo-detector coupled to an output of the optical combiner to generate the precoded vector signal at the upconverted frequency; and
an optical transmitter that transmits an optical signal generated from the precoded vector signal at the upconverted frequency on an optical transmission medium.

17. The transmitter apparatus of claim 16, wherein the I/Q modulator includes:
a first Mach-Zehnder modulator (MZM) having a first input coupled to the data interface and a first output coupled to an adder, the first MZM generating an in-phase modulation output from the precoded vector signal;
a second MZM having a second input coupled to the data interface and a second output coupled to the adder through a phase shifter, the second MZM generating a quadrature modulation output from the precoded vector signal; and
the adder having an adder output for outputting the precoded vector signal at baseband.

18. The transmitter apparatus of claim 17, wherein the first MZM and the second MZM are operated by biasing at their respective null points and driven at their respective full voltage swings.

19. The transmitter apparatus of claim 16,
wherein the upconverted frequency is equal to a frequency difference between frequencies of the first optical carrier signal and the second optical carrier signal.

20. The transmitter apparatus of claim 16, wherein the I/Q modulator is capable of modulating the information bits with a quadrature phase shift keying (QPSK) modulation scheme.

21. The transmitter apparatus of claim 20, wherein the QPSK modulation scheme is an 8-QPSK modulation scheme.

22. The transmitter apparatus of claim 20, wherein the QPSK modulation scheme is a balanced QPSK modulation scheme.

23. The transmitter apparatus of claim 16, wherein the I/Q modulator is capable of modulating the information bits with an unbalanced modulation scheme.

24. The transmitter apparatus of claim 16, wherein the optical transmitter includes:
an intensity modulator (IM) having an IM input to receive the precoded vector signal at the upconverted frequency, a carrier input to receive an optical carrier signal and an IM output to output a signal that includes two first-order modulated optical subcarriers; and
a photodetector (PD) that includes a PD input coupled to the IM output and a PD output to output the optical transmission signal by heterodyne beating the two first-order modulated optical subcarriers.

25. The transmitter of apparatus of claim 24, wherein the intensity modulator is capable of operating at a minimum transmission point to implement optical carrier suppression modulation.

26. The transmitter apparatus of claim 24, wherein the PD is capable of operating in a single-ended configuration.

27. The transmitter apparatus of claim 16, wherein the I/Q modulator is capable of modulating the information bits using a quadrature amplitude modulation (QAM) scheme.

28. The transmitter apparatus of claim 24, wherein the intensity modulator (IM) is a Mach-Zehnder modulator (MZM).

* * * * *